United States Patent [19]

Vail

[11] 4,297,590

[45] Oct. 27, 1981

[54] POWER SUPPLY SYSTEM

[76] Inventor: Ande Vail, 3702 Unit C, Overland Rd., Boise, Id. 84705

[21] Appl. No.: 128,566

[22] Filed: Mar. 10, 1980

[51] Int. Cl.³ .................................... H02J 7/34
[52] U.S. Cl. ................................ 307/43; 307/48; 307/81; 318/139; 320/19; 320/21
[58] Field of Search ............... 307/43, 10 BP, 46, 48, 307/55, 66, 81, 96, 115; 318/139, 248, 252, 440; 320/19, 21; 361/166, 190, 189; 330/147; 315/172

[56] References Cited

U.S. PATENT DOCUMENTS

| | | | |
|---|---|---|---|
| 2,836,734 | 5/1958 | Cichanowicz | 307/81 |
| 3,070,778 | 12/1962 | Werme | 307/81 X |
| 3,611,091 | 10/1971 | Genovese | 318/248 |
| 4,101,787 | 7/1978 | Vail | 307/81 |

Primary Examiner—L. T. Hix
Assistant Examiner—Stafford D. Schreyer
Attorney, Agent, or Firm—Terry M Crellin; B. Deon Criddle

[57] ABSTRACT

A power supply system includes three sets of batteries for supplying direct current to a load. Three sets of switches connect mutually respective sets of batteries to the load. A controller operates the switching means so that at any time at least two of the sets of batteries are connected in parallel to the load. The controller alternates each set of switches in open and closed positions with the switches being operated in a predetermined, cyclic manner, so that during the cycle, each of the sets of batteries provides current to the load for a portion of the cycle and is disconnected from the load for the other portion of the cycle. Utilizing the sets of batteries in pairs so that each set of batteries provides only about half the current requirement and of repeatedly disconnecting each set of batteries for a short period of time while the other two sets of batteries supply the current which maximizes the life and performance of the batteries.

4 Claims, 2 Drawing Figures

POWER SUPPLY SYSTEM

BACKGROUND OF THE INVENTION

1. Field

This invention relates to an electrical power supply system utilizing three sets of batteries and switching means for successively switching a load among the sets of batteries.

2. Prior Art

There has been considerable interest in developing alternatives to gasoline powered vehicles for reasons both of reducing air pollution and of concern for the dwindling sources of oil. Some had thought that electrical power might be developed into an attractive alternative to the gasoline engine but thus far the lack of suitable long-lived batteries has inhibited progress in this direction. Any progress in improving electrical power supplies would, of course, be beneficial in a variety of situations besides that of powering vehicles.

In my earlier U.S. Pat. No. 4,101,787, issued July 18, 1978, a power system is disclosed having a plurality of batteries for supplying direct current to a load and switching means for alternatively opening and closing the respective circuits between the load and each of the batteries to cause intermittent current flow between each of the batteries and the load serially. Successively switching the load between a plurality of batteries greatly improves the overall life of the batteries.

Objectives

It is a principal objective of the invention to provide a highly efficient electrical power supply utilizing three sets of batteries. A further objective is to provide a system in which current is drawn from the sets of batteries in recurring cyclic fashion so that each set of batteries provides current for about ⅔ of the cycle time and is then disconnected from the load for the other ⅓ of the cycle time. An additional objective is to provide for cyclic operation in which at least two sets of batteries are always connected in parallel with the load so that when connected, each set of batteries supplies only about ½ the total current draw of the load. It is still a further objective of the invention to provide a system for successively switching a load between three sets of batteries to maximize the overall life and performance of the batteries. It is still a further objective of this invention to provide a system wherein the voltage of the three battery banks will be equalized thereby extending the usable lifetime of the batteries.

SUMMARY OF THE INVENTION

The above and other objectives of the present invention are realized in an embodiment of an electrical power supply which includes three batteries or three sets or banks of batteries and three sets of switching means connecting mutually respective sets of batteries to the load. A controller is provided for operating the switching means so that current is drawn from the sets of batteries in recurring cyclic fashion, with each set of batteries providing current for ⅔ of the cycle time while being disconnected from the load for the other ⅓ of the cycle time. The control system is programmed so that are activated serially and in cyclic sequence, with a typical cycle comprising the following three steps which occur serially at equal time intervals: (1) closing the first switch and at about the same time opening the second switch; (2) closing the second switch and at about the same time opening the third switch; and (3) closing the third switch and at about the same time opening the first switch. The cycle is repeated with a time interval between steps (3) and step (1) being equivalent to the time interval between steps (1) and (2) and steps (2) and (3). By switching between the sets of batteries in such fashion, it has been found that the useful life and performance characteristics can be maximized.

Additional objects and features of the invention will become apparent from the following detailed description taken together with the accompanying drawings.

THE DRAWING

A preferred embodiment of the power supply system of this invention representing the best mode presently contemplated of carrying out the invention in actual practice is illustrated in the accompanying drawing, in which:

FIG. 1 shows a block diagram of an electrical power supply system made in accordance with the principles of the present invention; and FIG. 2 is a timing diagram showing output signals from the control logic module of the circuit of FIG. 1.

DETAILED DESCRIPTION OF THE ILLUSTRATED EMBODIMENT

Figure 1:
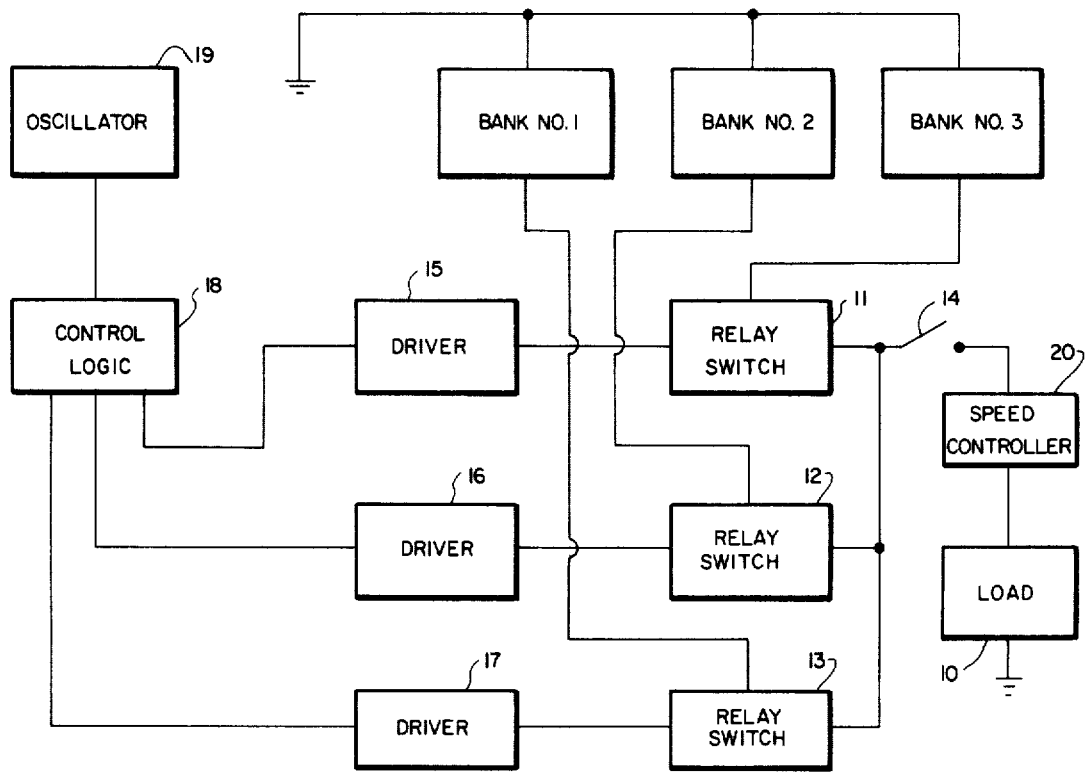

In accordance with the invention, three banks of batteries, labeled bank No. 1, bank No. 2, and bank No. 3 are provided for supplying current to a load 10. Each bank may include one or more batteries depending upon the voltage required from each bank to operate the load 10. Each of the banks of batteries is coupled by way of a respective relay switch 11, 12, and 13 and a common on/off switch 14 and a speed controller 20 to the load 10. Thus, with the on/off switch 14 in its on position, bank number 1 of batteries will be in connection with the load 10 when the relay 13 is activated so as to complete the connection thereto. Similarly bank number 2 will be in connection with the load 10 when relay 12 is activated, and bank number 3 will be in connection with the load 10 when relay 11 is activated. When any of the relays 11, 12, and 13 are activated simultaneously, the respective banks of batteries are then connected in parallel to the load 10.

The relays 11, 12, and 13 are coupled to mutually respective relay drivers 15, 16, and 17, and, in turn, each of the relay drivers 15, 16, and 17 are coupled to separate outputs of a control logic 18. For purposes of explanation, relay driver 15 will be considered to be connected to logic output 1, with relay drivers 16 and 17 being connected to logic outputs 2 and 3, respectively. The control logic is connected to an oscillator 19. The oscillator 19, control logic 18 and relay drivers 11, 12, and 13 can be powered by controlled voltages from any of the banks of batteries.

Figure 2:
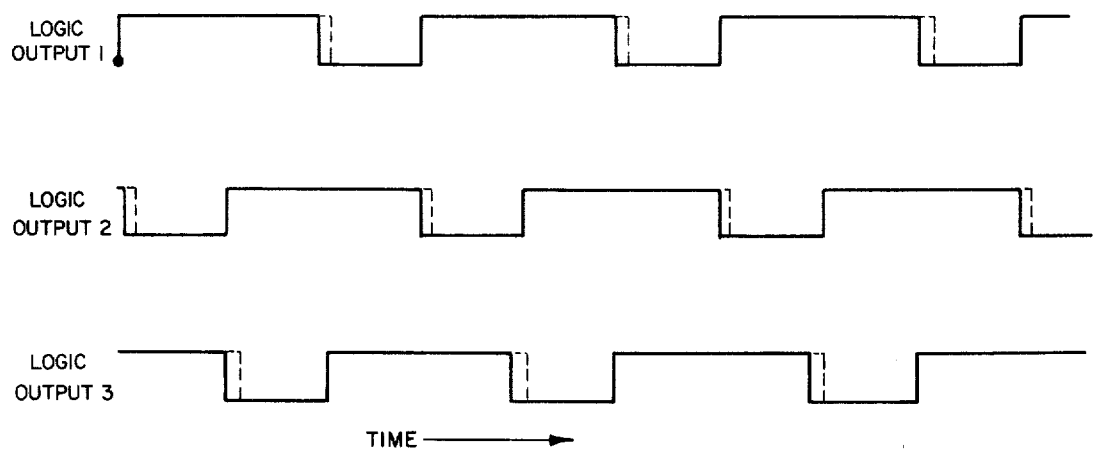

The oscillator 19 is adapted to produce a square wave signal having an adjustable period of approximately 2 seconds to 5 seconds. The control logic 18 is adapted to produce three square wave output signals which change states serially with input pulses from the oscillator. A timing diagram is shown in FIG. 2 showing the three output signals from the control logic 18. As shown, each of the output signals has a square wave with the duration of the high portion being about twice the duration of the off or low portion. Logic output 1 turns high and logic output 2 turns low on one of the pulses from the oscillator 19. On a subsequent pulse from the oscillator 19, logic output 2 turns high and logic output 3 turns low. On the next subsequent pulse from the oscillator 19, logic output 3 turns high and logic output 1 turns low. The cycle is then repeated upon subsequent pulses from the oscillator 19.

The logic outputs from the control logic 18 are coupled to relay drivers 15, 16, and 17, respectively. The relay drivers are, in turn, connected to the relays 11, 12, and 13, respectively, and are adapted to activate their respective relays when the logic output to the respective relay driver is on or high. In a particularly preferred embodiment, the relay drivers 15, 16, and 17 are adapted to delay the opening of their respective relays 11, 12, and 13 for a short period following the logic output turning low. The delays produced by the line drivers is shown as dashed lines imposed on the timing diagram of FIG. 2. The time delay is preferably about 0.25 second to 0.5 second depending upon the period of the oscillator 19.

As illustrated, the relay drivers 15, 16, and 17 operate the relays 11, 12, and 13 in such manner that the load 10 is connected sequentially to the banks of batteries nos. 1,2, and 3 in a particular cyclic order. In operation, the controller 18 and relay drivers 15, 16, and 17 alternate the relay switches 11, 12, and 13 in open and closed cycles wherein the closed position has a time duration about twice that of the open position, and the switches 11, 12, and 13 are switched open and closed in cyclic predetermined order, with the switch 11 closing at about the same time the switch 12 opens, the switch 12 closing about the same time the switch 13 opens, the switch 13 closing about the same time switch 11 opens, and then repeating such switching cycle over and over. As can be seen from the timing diagram of FIG. 2, the load draws current equally from two banks of batteries at most instances. At the instances when the relay switches are opening and closing, there is a short overlap in which all three banks of batteries concurrently supply current to the load. The operation in accordance with the present invention provides a repeating rest period for each bank of batteries, with the rest period having a duration of about ⅓ the total cycle. Sequencing of the banks of batteries provides for a fresh bank of batteries to be switched into connection with the load every ⅓ cycle, with the bank of batteries which had previously been connected to the load for ⅔ cycle being disconnected for the rest period.

With at least two banks of batteries always being connected in parallel to the load, the current load of any bank is only half that which would be drawn if each bank were connected singly to the load. The short overlap in the connections at the switching points in the cycle provides repeating short periods wherein all three banks of batteries are connected in parallel. Having two banks normally in connection with the load with the overlap occurring during switching of the banks results in reducing relay point arcing to a minimum.

When Bank 1 and Bank 2 are paralleled the voltages of these banks will be equalized. When Bank 2 and Bank 3 are paralleled the voltages these banks will be equalized. When Bank 3 and Bank 1 are paralleled the voltages of these banks will be equalized. This equallizing effect causes all three banks to remain balanced in voltage during the normal operating period. This guarantees that the load 10 receives the same power through the speed controller 20 regardless of which banks of batteries are connected thereby extending the usable lifetime of the batteries.

The three battery system of the present invention utilizing a switching cycle in which two banks of batteries are always connected in parallel, results in a much greater increase in performance, especially endurance, in comparison to systems such as disclosed in my earlier patent preferred to above. In tests made on an electrically powered automobile, the automobile was able to operate for up to 5 times as long with the three bank system of this invention as compared to when two banks of batteries were used in alternating fashion as described in my earlier referenced patent. The batteries in the banks all being of equal number and duty, it would be expected that the three bank system would have a 50% greater capacity than the two bank system. However, tests show that a remarkable increase in capacity of about 500% is achieved.

The optimum time that any one bank of batteries is connected to the load per cycle can be readily determined experimentally for the particular kind of batteries being used. It is advantageous to select batteries having an ampere/hour rating of about 10 or more times the load current in amperes. Generally, for such batteries, it has been found advantageous for the time per cycle that any one bank of batteries is connected to the load to be from about 4 to 10 seconds, with the time per cycle that any one bank of batteries is disconnected being from about 2 to 5 seconds.

It is to be understood that the above-described arrangements are only illustrative of the application of the principles of the present invention. Numerous modifications and alternative arrangements may be devised by those skilled in the art without departing from the spirit and scope of the present invention, and the appended claims are intended to cover such modifications and arrangements.

I claim:

1. A power supply system for supplying direct current to a load, said system comprising:
   three sets of batteries, with each set of batteries having an ampere/hour rating of at least ten times the value of the load current;
   circuitry connecting each of the three sets of batteries to the load;
   three sets of switching means for opening and closing the respective circuits between the load and each set of batteries; and
   control means for alternating each set of switches in open and closed position, wherein the closed position has a time duration about twice that of the open position, and the switches are switched open and closed in cyclic, predetermined order with the first switch closing at about the same time the second switch opens, the second switch closing about the same time the third switch opens, the third switch closing about the same time the first switch opens, and then repeating the cycle.

2. A power supply system in accordance with claim 1, wherein each switch is in the closed position in each cycle for a duration of about 4 to 10 seconds.

3. A power supply system in accordance with claim 1, wherein means are provided for delaying the opening of each switch during each cycle so that each switch opens about ¼ to 1.25 seconds following the closing of the corresponding switch in the cycle, whereby at three distinct spaced time periods during the cycle, all three switches are closed.

4. A power supply system in accordance with claim 3, wherein each of the sets of switching means comprises a relay, and the control means comprises a control logic unit which supplies cyclic energizing pulses to three current drivers which in turn supplies energizing current to a mutually respective relay, with said current drivers being provided with means for delaying the opening of the respective switches for about ½ to 1.25 seconds after the pulses from the control unit to the current drivers are terminated.

* * * * *